Oct. 3, 1967
L. A. MITTEN
3,344,826
PRODUCTION OF PULP CHIPS AND STUD LUMBER FROM PEELER CORES
Filed Nov. 10, 1965
2 Sheets-Sheet 1
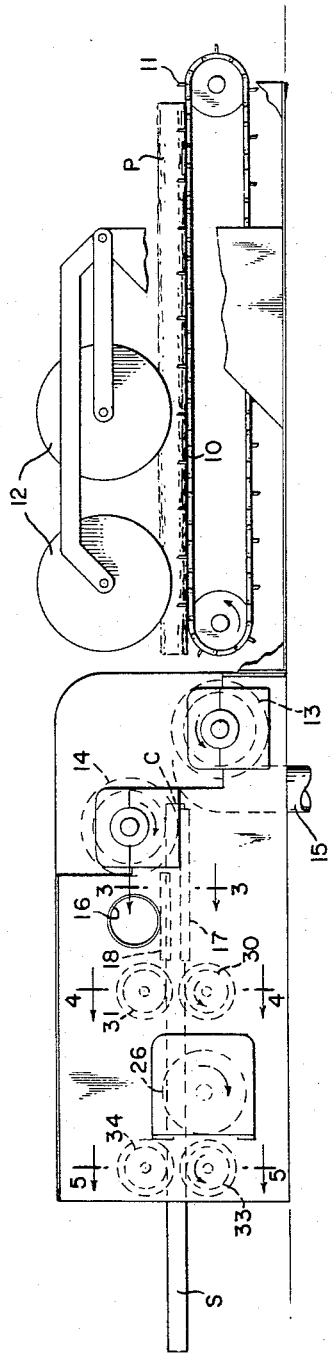
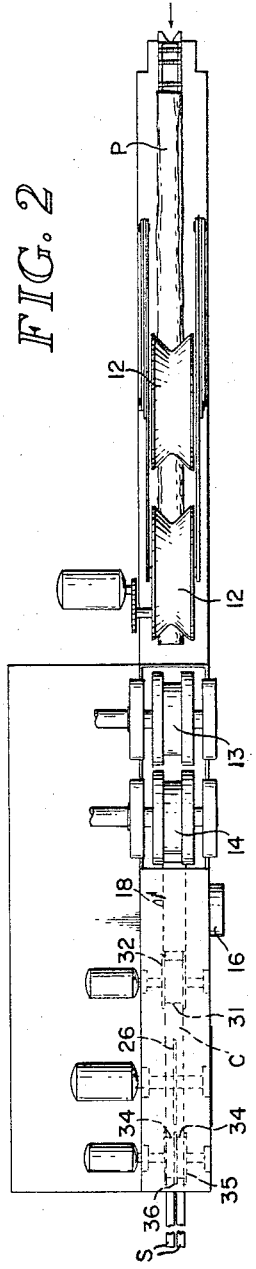
LEONARD A. MITTEN
INVENTOR.
BY Seed & Berry
ATTORNEYS Oct. 3, 1967  L. A. MITTEN  3,344,826
PRODUCTION OF PULP CHIPS AND STUD LUMBER FROM PEELER CORES
Filed Nov. 10, 1965  2 Sheets-Sheet 2
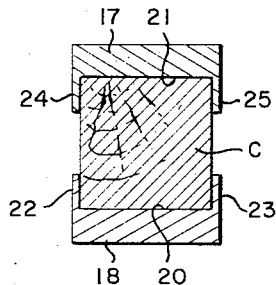
FIG. 3
FIG. 4
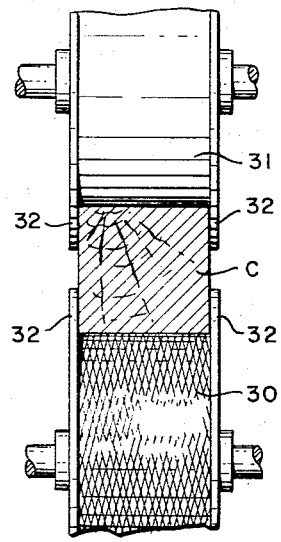
FIG. 5
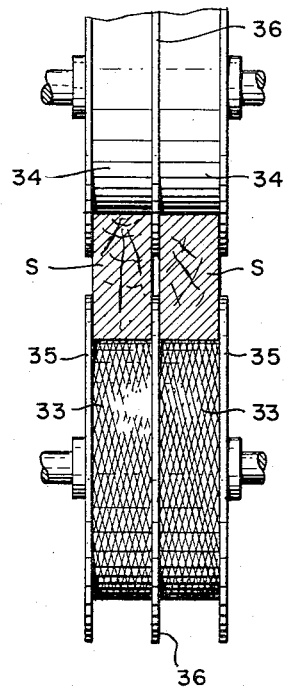
FIG. 6
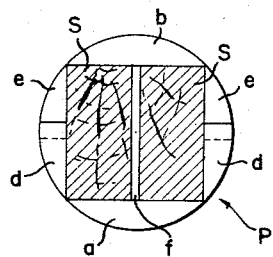
LEONARD A. MITTEN
INVENTOR.
BY Seed & Berry
ATTORNEYS

3,344,826
PRODUCTION OF PULP CHIPS AND STUD LUMBER FROM PEELER CORES
Leonard A. Mitten, Vancouver, British Columbia, Canada, assignor to Ernest E. Runnion, Shelton, Wash.
Filed Nov. 10, 1965, Ser. No. 507,112
4 Claims. (Cl. 144—3)

This invention relates to the cutting of small-diameter logs so as to obtain a maximum commercial return therefrom, and pertains especially to a machine and method for cutting peeler cores (5½" to 6" diameter) so as to obtain high-quality pulp chips from the outer portion of such core and stud lumber from the inner portion. The invention follows the general teachings of application for Letters Patent of the United States filed by Ernest E. Runnion, April 23, 1965, Ser. No. 453,547, now Patent No. 3,259,157, and this is to say that the peeler core is conveyed along a linear travel path and in course of its conveyed travel is subjected first to the action of cutter heads rotating in a "climb-cut" direction and then to the action of a saw. The cutter heads profile the travelling peeler core to a 4" x 4" square cant. The saw, bisecting the cant by cutting along the latter's longitudinal median line, produces two rough-cut studs.

The general object of the invention is to provide a perfected machine and method which will efficiently perform the intended function, namely to rapidly reduce peeler cores to pulp chips and stud lumber in a continuous process requiring a minimum of attention.

More particular objects and advantages will appear and be understood in the course of the following description and claims, the invention consisting in the new method and in the novel construction, adaptation and combination of the parts of a machine for performing the method, hereinafter described and claimed.

In the accompanying drawings:

FIGURE 1 is a fragmentary side elevational view illustrating a core-cutting mill constructed to embody the preferred teachings of the present invention, and applying direction arrows to the parts of the machine which are driven. Indicated in the view is a peeler core entering the infeed end of the mill and stud lumber issuing from the outfeed end.

FIG. 2 is a top plan view thereof. Cutter heads which chip the advancing core are shown schematically in this and the preceding view.

FIGS. 3, 4 and 5 are fragmentary transverse vertical sectional views on the respective lines 3—3, 4—4 and 5—5 of FIG. 1; and FIG. 6 is a diagrammatic view indicating the portions of the peeler core from which the pulp chips and stud lumber are obtained.

Referring to said drawings, the peeler core is denoted by the letter P. A conveyor comprised of an endless driven chain 10 is provided at the infeed end of the machine, and the peeler core is delivered to the upper run of the chain, lodging in the saddle notch formed by V-shaped flights 11. V-grooved idler pressure rolls 12 bear upon the conveyed log from above.

Travelling under the influence of such chain conveyor the peeler core, as it emerges from the tail end of such conveyor, traverses first a lower cutter head 13 and then an upper cutter head 14 each of which rotates about a fixed axis and is driven in the "climb-cut" direction represented by arrows in FIG. 1. These heads carry chipper knives which are or may be similar to those shown and described in the above-identified application. The knives are staggered circumferentially of the head in the conventional manner, and in the present mill are so arranged that the core, upon its traversal of the cutter heads, is profiled to the 4" square cross-sectional configuration shown in FIG. 6, and namely a square the sides of which comprise chords of a circle corresponding in diameter to the diameter of the peeler core. Both cutter heads are alike, albeit mounted so that the lower head cuts from the underside and the upper head from the upperside of the travelling core. Portrayed schematically in FIG. 2, each head has a set of center knives which convert to pulp chips the two segments marked *a* and *b* in FIG. 6, and flanking knives protruding a substantial distance beyond the cutting plane of the center knives so as to convert to pulp chips the partial segemnts marked *d* and *e* in FIG. 6. More particularly, the protrusion of such flanking knives somewhat exceeds one-half the vertical spacing between the cutting planes of said upper and lower center knives, thus to have the cutting plane of the upper flanking knives lap that of the lower flanking knives.

For collecting the pulp chips thrown from the cutter heads, the chips are directed into the mouth of a respective one of two chutes 15 and 16.

Immediately upon its traversal of the cutter heads, the profiled portion of the travelling core, i.e. the square cant C, is engaged by fixed lower and upper guide shoes 17 and 18, respectively. Each guide shoe presents a horizontal planar bearing surface, as 20 and 21, against which the bottom and top faces of the square cant bear, and confining curbs, as 22–23 and 24–25, which bear against side edges to constrain the travelling cant against lateral deflection.

The mill has a 16" diameter direct-driven circular saw 26 located adjacent its outfeed end operating to divide the travelling cant into two 2" x 4" studs S by making a vertical saw-cut—designated by *f* in FIG. 6—on the cant's longitudinal median line. A primary set of upper and lower rolls lies between the guide shoes and the saw, and an outfeed set of upper and lower rolls lie to the rear of the saw. The two sets of rolls take over from the shoes to guide the cant through the saw, and have the added function of continuing the feed initially performed by the conveyor chain. The lower roll in each set is knurled and power-driven. The upper roll is a press roll yieldingly urged toward the driven roll. The primary rolls each present a single tongue, as 30 and 31, with a flange 32 at each of the two sides. The outfeed rolls each have two tongues, as 33—33 and 34—34, with a flange 35 at each side and a dividing flange 36 at the center. The side flanges on the two sets of rolls lie co-planar one with another and with a related set of curbs 22–24 or 23–25, as the case may be. The flange 36 lies co-planar with the saw 26.

It is thought that the machine and method will have been clearly understood from the foregoing description. It is my intention that no limitations be implied and that the hereto annexed claims be given the broadest interpretation to which the employed language fairly admits.

What I claim is:

1. In a stud mill, a localized cutting station, means for conveying a succession of logs having a diameter of 5½" to 6", approximately, along an established travel path which includes said cutting station, and a set of cutter heads occupying said cutting station and together acting upon the conveyed log to reduce to pulp chips four segmental portions of the travelling log leaving a square cant measuring 4", approximately, along a side, guide means being provided which establish and maintain a bearing upon each of the four flats of the developing cant as soon as said flats take form and thereby constrain the cant against either turning about its axis or deviating from the established travel path as the following portion of the log is being chipped.

2. A stud mill as claimed in claim 1 in which the set of cutter heads comprises two heads each so formed that it chips from the log a respective one of two opposite segments and half portions from each of the other two segments.

3. A stud mill as claimed in claim 1 in which the established travel path includes a localized sawing station, and having means for conveying the cants, without interruption in their travel, through said sawing station after the cants issue from the cutting station, said sawing station being occupied by a saw acting to saw through the conveyed cant on a median longitudinal plane thereof to divide the cant into two like pieces of stud lumber, means being provided which bear upon each of the four flats of the cant to guide the cant during the period in which it is being sawed.

4. A stud mill as claimed in claim 3, the means which guides the cant as it is being sawed comprising a first set of rolls located to the front of the saw and a second set of rolls located to the rear of the saw, the sets of rolls each comprising a lower feed roll and an upper press roll, the rolls of the first set being each a single-tongue roll with confining flanges at the sides, the rolls of the second set being each a double-tongue roll with a dividing flange at the center to hold the stud lumber spread as it issues from the saw.

References Cited
UNITED STATES PATENTS

| | | | |
|---|---|---|---|
| 1,421,204 | 6/1922 | Fritz | 143—22 |
| 1,825,041 | 9/1931 | Babare. | |
| 1,842,419 | 1/1932 | Morris. | |
| 3,204,675 | 9/1965 | Griffin | 144—326 |
| 3,313,329 | 4/1967 | Mitten | 144—312 |

WILLIAM W. DYER, JR., *Primary Examiner.*

W. D. BRAY, *Assistant Examiner.*